United States Patent Office 3,709,877
Patented Jan. 9, 1973

3,709,877
PROCESS FOR THE SULFATION OF
CELLULOSIC ETHERS
Deger Tunc, Edison, N.J., assignor to Johnson & Johnson
Filed Mar. 7, 1972, Ser. No. 232,371
Int. Cl. C08b 11/20
U.S. Cl. 260—232
13 Claims

ABSTRACT OF THE DISCLOSURE

A process for manufacturing sulfated alkali cellulose ethers by reacting together cellulosic ethers and sulfating agents in an organic diluent medium. The reacted mixture is then combined with water to form a mother liquor from which the sulfated cellulose ethers are precipitated. By carefully controlling the concentration parameters of the mother liquor, a product will precipitate which can be cast into a film capable of rapidly dissolving in water. Specifically, the mother liquor should be controlled to maintain a pH of at least about 3.8 and a cation concentration of a prescribed level.

BACKGROUND OF THE INVENTION

This invention concerns the preparation of sulfated cellulose ethers and particularly the preparation of such ethers as will be capable of forming strong films, resistant to aqueous salt solutions and soluble in water. Such films are generally useful for packaging purposes and particularly for the packaging of dyes and detergents as used in home laundry operations. Specifically, this invention relates to a process for sulfating cellulosic ethers in a diluent organic reaction medium, precipitating the sulfated cellulose ethers from a mother liquor formed from an inexpensive precipitation liquid while carefully controlling the precipitation process parameters so as to insure good recovery of water soluble, film-forming products and then purifying the products to free the same of co-precipitated salts.

Sulfated cellulosic ethers are produced by reacting a cellulosic ether with a sulfating agent in a reaction medium comprising an acidic organic diluent, and recovering the resulting sulfated product by precipitation. It has heretofore been extremely difficult to separate a water soluble product from the reaction medium using an inexpensive precipitating liquid. For example, a prior method of accomplishing this separation is to add, to the reacted reaction medium, sufficient isopropyl alcohol to precipitate the sulfated cellulose ether. While this method has advantages in that the sulfated ether is precipitated in an essentially pure form, several drawbacks are encountered. First, the isopropyl alcohol is an expensive precipitating liquid and, therefore, either a large operating expense results from loss of this liquid in the operation of the process, or alternatively, a substantially capital investment is required for equipment to recover the same. Further, the isopropyl alcohol is a highly volatile liquid and must be handled with great care. Still further, while the sulfated cellulose ether product is substantially insoluble in isopropyl alcohol, a small but significant quantity does dissolve therein and is lost in the process or is recovered only with great difficulty and expense.

An alternative method of recovering the sulfated ether is to add large quantities of water to the reaction mixture. This method is only limitedly useful, as for example, when attempting to precipitate water-insoluble sulfated ethers and is not adequate when attempting to recover sulfated ethers which are, to any significant extent, water soluble. Accordingly, there is a need for an inexpensive process for recovering water-soluble, sulfated cellulose ethers.

SUMMARY OF THE INVENTION

In accordance with this invention, a process is provided for manufacturing sulfated alkali cellulose ether by reacting together cellulose ethers and a sulfating agent in a mixture comprising the ether, the sulfating agent and an acidic organic diluent, e.g., a lower fatty acid. The reacted mixture is then combined with water to form a mother liquor from which the sulfated cellulose ether is precipitated.

It has been discovered that by carefully controlling the concentration parameters of the mother liquor, a product will precipitate which can be cast into a film capable of rapidly dissolving in water. Further, almost complete recovery of this product can be realized. Specifically, it has now been discovered that excellent recovery of a water soluble film forming resin may be accomplished by decreasing the acidity of the formed mother liquor and by maintaining the cation concentration at a sufficiently high level. Generally, it has been discovered that the pH of the mother liquor should be maintained at least 3.8, and preferably, above 7. The cation concentration in the mother liquor should be maintained in accordance with the following relationship:

$$\mathrm{Log}_{10}\ C^+ = 15.0\ (D.S.) - 4.4$$

where:

$C^+$ is defined as the cation concentration in the mother liquor in gram equivalent per liter; and
D.S. is defined as the degree of sulfate substitution in moles of $SO_4^=$ group per anhydrous glucose unit.

By thus operating in accordance with the teachings of this invention, an inexpensive and harmless liquid, water, may be used as the precipitating liquid in place of such dangerous and expensive prior art liquids, such as isopropyl alcohol. Unlike such prior methods, no significant quantity of sulfated ether will remain dissolved and hence be lost to the process.

In a specific embodiment, water soluble alkali ethyl cellulose sulfate, for example, is produced by reacting together, at a temperature of about 21° C. to about 32° C., ethyl cellulose and an alkali sulfating agent, in a substantially anhydrous medium of acetic acid. The reaction mixture is then precipitated from an aqueous mother liquor containing a quantity of a strong base sufficient to maintain the pH at least about 3.8, and preferably at least about 7. The mother liquor is maintained at a sufficient cation concentration to precipitate the otherwise water-soluble sulfated ethyl cellulose and avoid loss of any unprecipitated product. The source of cations may be the strong base itself, as for example, when an alkali or alkaline earth hydroxide is employed. Alternatively, or where the cation concentration provided by a base is insufficient, a source of cations may be provided by incorporating into the precipitating solution a soluble salt, such as for example, potassium chloride, sodium chloride, potassium sulfate, calcium chloride, magnesium sulfate, or sodium sulfate.

Further, in accordance with this instant invention, a product may be obtained which is substantially free of any inorganic salts which may be co-precipitated along with the sulfated ethers and is at least as free of such co-precipitated salts as is the product obtained with the aforementioned prior art isopropyl alcohol precipitation liquid. For example, the precipitated, impure sulfated ethers may be separated from the mother liquor and subjected to a purifying step which may comprise a hot water wash or, alternatively or in combination, a salt water wash. In another embodiment, a purified product may be obtained by dialysis. By any of these methods a water-soluble, salt resistant, film forming resin may be obtained essentially free of co-precipitated inorganic salts without resorting to the expensive, inconvenient and inefficient methods of the prior art.

DETAILED DESCRIPTION OF THE INVENTION

Alkali cellulose sulfate is produced by reacting together cellulose ethers and a sulfating agent in a lower fatty acid reaction medium such as for example, anhydrous acetic acid. The ethers, used as the starting materials, are generally prepared by reacting a purified form of cellulose with either an alkyl halide, an alkylene oxide or both to form either the alkyl ether, the hydroxyalkyl ether, or the hydroxyalkyl-alkyl ether, respectively. For example, methyl cellulose or ethyl cellulose may be prepared by reacting together alkali cellulose with methylchloride or ethylchloride, respectively. Hydroxypropyl cellulose may be made by reacting together propylene oxide and alkali cellulose.

The sulfating agent may be prepared by reacting acetic anhydride with sulfuric acid and an alkali sulfate, all in an acetic acid solution, to form alkali acetyl sulfate in accordance with the reaction:

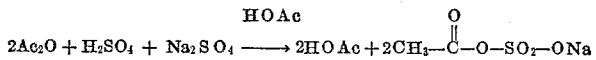

This reaction may take place in a well-stirred reactor which is jacketed to form an annulus through which a cooling medium, such as cooling water, is circulated to maintain the reaction temperature below about 55° C.

The sulfating agent and the cellulose ether are combined in a stirred reactor at a temperature of about 21 to about 32° C. The reactor is jacketed with cooling coils containing a recirculating brine solution. Because the reaction occurs in the liquid state, sufficient anhydrous acetic acid is required to maintain the cellulose in liquid solution. The reactants may be introduced into the stirred, cooled reactor in several ways, and the reaction step may proceed batchwise or continuously. For example, the cellulose ether may be first dissolved in anhydrous acetic acid, preferably at temperatures such as from about 21° C. to about 38° C. This solution is then co-mixed in the jacketed reactor with the sulfating agent and the alkali sulfate, the mixture in the reactor then being maintained at the reaction temperatures of about 21 to about 32° C. Alternatively, the reactants may be added individually and continuously to the reactor, the reactor being well stirred to aid in the dissolution of the cellulose ether. The reacted products may be withdrawn continuously.

The resultant reacted mixture comprises a solution of alkali cellulose sulfate ether, anhydrous acetic acid and unreacted alkali sulfate and sulfating agent. This mixture is then combined with water to form an aqueous mother liquor having the controlled concentration prescribed herein. In accordance with this invention, the water-soluble alkali cellulose sulfate may be precipitated from the aqueous mother liquor by controlling the concentration with respect to pH and the cation concentration. Specifically, it has been discovered that in order to precipitate an alkali cellulose sulfate ether product which is capable of forming water soluble film, the pH of the mother liquor must be carefully controlled and maintained at at least about 3.8, and preferably at least about 7. For example, a good operating range is at a pH of 11–13. In this connection, it should be noted that the test for determining whether or not a film is water soluble is a practical one, relating to the end use of the product. As used herein, a film is termed water soluble when a sample, 1.4 mils thick and 1 cm. square, loses its structural integrity and breaks up in five minutes or less when submerged in 150 ml. of deionized water at 25° C. and slowly stirred. By maintaining the pH of the mother liquor from which the product precipitates at at least about 3.8, films may be cast from the precipitated product which satisfy this water solubility test. By maintaining the pH at the still higher preferred values of at least about 7, and for example at 13, films may be cast which exhibit advantageously higher degrees of solubility in water and are generally less opaque and more flexible.

The pH of the mother liquor may be maintained by adding a strong base either during the precipitation step or, alternatively, by adding the base to the precipitating solution before admixing the same with the reacted solution in the precipitating step. In either case, as will become apparent from the following disclosure, it is advantageous to add an alkali base such as sodium or potassium hydroxide.

In accordance with this invention, it has been found that the quantity of water soluble product recovered is a function of still another precipitation parameter, i.e., the cation concentration in the mother liquor. The cation concentration is maintained at at least a value satisfying the relationship:

$$\log_{10} C^+ = 15.0\,(D.S.) - 4.4$$

where:

$C^+$ is defined as the cation concentration in the mother liquor in gram equivalent per liter; and D.S. is defined as the degree of sulfate substitution in moles of $SO_4^=$ group per anhydrous glucose unit.

When this relationship is maintained, excellent recovery of sulfated cellulose ether is obtained, ranging from about 80 to almost 100 percent recovery based on cellulose initially fed into the process.

The required concentration of cations, may in most instances, be satisfied completely by using an alkali base to maintain the mother liquor within the pH limitations set out herein. However, where this source is inadequate, a supplemental source such as soluble salt, e.g., $Na_2SO_4$, $CaSO_4$, or KCl may be added, either to the precipitating solution or directly to the mother liquor. Still another way of providing sufficient cations is, in the production of the sulfating agent, to utilize a great excess of alkali salts and carry the unreacted portion thereof, through the process, to the precipitation step.

Because of the completeness of the recovery of the sulfated cellulose ethers, a small quantity of salts such as sodium acetate or sodium sulfate will co-precipitate and the presence of these co-precipitated salts will render films, cast from such contaminated ethers, opaque and in extreme cases, will destroy the structural integrity of the films. Accordingly, the precipitated product must be purified to eliminate these co-precipitated salts. Several useful methods for doing this take advantage of some of the unique properties of the sulfated alkali cellulose ethers. In accordance with one method of this invention, the precipitated product may be substantially freed of co-precipitated salts by subjecting the same to a washing step wherein the wash fluid is heated water at a temperature which preferably ranges from about 80° to about 100° C. This washing method takes advantage of the unique inverse solubility of the sulfated cellulose ethers, i.e., the sulfated cellulose ethers are more soluble in water as the temperature of the water is decreased. In contrast to this, the coprecipitated salts exhibit the usual increase in solubility with increasing water temperature and, by virtue of this difference, the impure precipitate may be readily washed substantially free of the co-precipitated salts with only a small loss of product in the wash water. The precipitate should be washed in approximately 2–20, and preferably ten, times its weight of warm water, with the washing carried out either continuously or batchwise. By operating the washing step at the higher temperature range of about 90 to about 100° C., there is essentially no loss of product in the wash water and hence, no need to provide any further processing to recover same.

An alternative method to that of using a hot water wash is to provide wash water having an alkali salt concentration of about one to about three percent by weight.

This purification method takes advantage of the fact that these sulfated cellulose ethers are substantially less soluble in cation containing aqueous solutions than in water. This relationship is true even though the aqueous solution is far from being saturated with respect to salt and, therefore, a considerable driving force will remain to transfer the co-precipitated salts in the impure precipitate into the salt-containing wash water. This washing method is most effective when a quantity of salt is provided which is just sufficient to prevent loss of cellulose product and at the same time is small enough to maintain a sufficient capacity for co-precipitated salt dissolution. This generally occurs at a salt concentration of about 0.9 to about 2.5 percent by weight. A preferable method of washing is to use the lower level of the range of salt concentrations such as about 0.9 to about 1.5, in conjunction with wash water at an elevated temperature, e.g., above about 80° C. and preferably about 100° C.; the elevated temperatures increasing the capacity for salt dissolution.

While two methods have been described above for the purification of the precipitate obtained by the novel methods of this invention, many others exist which under particular circumstance, may be preferable, e.g., the precipitate may be dialyzed against water through a semipermeable membrane. Dialysis will yield an extremely pure product. A drawback associated with this method, however, is that the dialysis process is an extremely slow one requiring expensive processing equipment.

The invention may be better understood by the following examples:

EXAMPLE 1

A sulfating agent is prepared by charging into a jacketed, well-stirred vessel, the following components:

| Components: | Parts by weight |
|---|---|
| Acetic anhydride | 3,959 |
| Glacial acetic acid | 1,277 |
| Sodium sulfate | 1,034 |
| Sulfuric acid (95%) | 490 |

The reaction within the vessel is maintained at a temperature of less than 55° C., for a period of approximately 30 minutes, after the addition of the sulfuric acid is completed, by circulating cooling water through the jacketed reactor annulus. The resulting sulfating agent is combined, in a jacketed reactor, with 17,730 parts by weight of anhydrous acetic acid and 7,000 parts by weight of ethyl cellulose ether having a degree of ethoxyl substitution of 2.58 and a viscosity of 45 centipoises (when a 5% by weight resin solution is dissolved in a solvent consisting of 80 parts by weight of toluene and 20 parts by weight of ethanol, the viscosity being measured at 25° C.). The reactor is well-stirred and is cooled by circulating, within the jacket annulus, a brine solution, the temperature within the reactor being maintained at between 15 and 21° C. After 30 minutes from the completed addition of the sulfating agent, the reacted mixture is withdrawn from the reaction vessel and combined with a precipitation solution consisting of 120 kilograms of water, 15 kilograms of sodium hydroxide and 15 kilograms of sodium sulfate to form a mother liquor having a pH of 13. A precipitate results which is passed through a filter and then washed with ten times its weight of water, said water being maintained at a temperature of 97 to 100° C. The pH of the product is adjusted during the washing step by the addition of sodium hydroxide to maintain a pH of about 5 to 6. The quantity of product obtained represents just less than a 100 percent recovery of the cellulose fed into the processes. The product, having a D.S. of about 0.29, is dissolved in a casting solution of two parts by volume methanol to one part by volume of water and a film is cast therefrom. The resulting film is clear, strong, water soluble, and resistant to salt solutions.

To illustrate the importance of maintaining the pH during the precipitation process, the following example is given:

EXAMPLE 2

The procedure, as outlined in Example 1, is followed with the exception that the pH of the mother liquor is maintained at various values, as shown in the table below. Films are cast from each of the resulting products and the solubilities in water are tested by submerging a sample of such film, 1.4 mls. thick and 1 cm. square in 150 mls. of deionized water at 25° C. and slowly stirring. The results are tabulated below:

TABLE 1

| Sample: | Mother liquor pH | Film breakup | Appearance of film |
|---|---|---|---|
| 1 | 13 | 1 min., 20 sec. | Excellent. |
| 2 | 4.7 | 2 min., 40 sec. | Do. |
| 3 | 3.8 | 4 min., 30 sec. | Somewhat opaque. |
| 4 | 3.1 | Over 24 hours | Opaque and brittle. |

To illustrate the effect of the cation concentration on recovery, the following example is given:

EXAMPLE 3

A portion of the reaction mixture of Example 1, containing the sulfated ether having a D.S. of about 0.29, is charged into a mother liquor having a pH of 11.0 and a varying sodium ion concentration as tabulated below. The solubility of sodium ethyl cellulose sulfate is observed and is recorded below:

TABLE 2

| Gram equivalent per liter:[1] | Observation of sulfated ether solubility |
|---|---|
| 0.08 | Completely soluble. |
| 0.26 | Cloudy, essentially soluble. |
| .90 | Substantially insoluble. |
| 2.70 | Completely insoluble. |

[1] Mother liquor sodium ion concentration.

To illustrate the effect of the cation concentration on recovery as a function of the degree of sulfate substitution (D.S.), the following example is given:

EXAMPLE 4

The procedure of Example 1 is carried out up to the point of the introduction of the reacted mixture to the mother liquor with the exception that the proportion of sulfating agent to cellulose ether is varied to give the various degrees of sulfate substitution tabulated below in Table 3. Each of the resulting sulfated ether reaction mixtures are introduced into a mother liquor and the cation concentration required to obtain substantial insolubility is determined. These results are tabulated below.

TABLE 3

| D.S. (moles of $SO_4^=$ per mole of anhydrous glucose unit): | Gram equivalents per liter [1] |
|---|---|
| 0.15 | 0.007 |
| 0.21 | 0.057 |
| 0.29 | 0.904 |

[1] Mother liquor sodium ion concentration required for substantial insolubility.

The preceding tabulated data has been plotted as shown in the attached drawing wherein the ordinate is the log (to the base 10) of the cation concentration in gram equivalents per liter and the abscissa is the D.S. The linear relationship resulting from this graphic representation is as follows:

$$\text{Log}_{10} C^+ = 15.0 \, (D.S.) - 4.4$$

where:

$C^+$ is defined as the cation concentration in the mother liquor in gram equivalent per liter; and
D.S. is defined as the degree of sulfate substitution While the invention has been described in terms of specific embodiments and illustrated with specific examples, it will be understood, by one skilled in the art, that variations and modifications can be affected within the scope and spirit of the invention as described above and as defined in the appended claims.

What is claimed is:

1. A process for manufacturing alkali cellulose ether sulfate comprising:
   (a) reacting together cellulose ether and an alkali sulfating agent in a mixture comprising the ether, the sulfating agent and a lower fatty acid to form a reacted mixture comprising alkali cellulose ether sulfate;
   (b) forming a mother liquor by combining said reacted mixture with water and precipitating, from said mother liquor, alkali cellulose ether sulfate and co-precipitated salt impurities by maintaining said mother liquor at a pH of at least about 3.8 and at a cation concentration of at least the value which satisfies the relationship:

$$\text{Log}_{10} \, C^+ = 15.0 \, (D.S.) - 4.4$$

where:
   $C^+$ is defined as the cation concentration in the mother liquor in gram equivalent per liter; and
   D.S. is defined as the degree of sulfate substitution in moles of $SO_4^=$ group per anhydrous glucose unit; and
   (c) separating said precipitate from said mother liquor and purifying same to remove co-precipitated salts from the alkali cellulose ether sulfate.

2. The process of claim 1 wherein the mother liquor is maintained at a pH of at least about 7.

3. The process of claim 1 wherein said alkali cellulose ether sulfate has a D.S. of at least 0.15 and said cation concentration is at least 0.007.

4. The process of claim 1 wherein said alkali cellulose ether sulfate has a D.S. of at least 0.29 and said cation concentration is at least 0.9.

5. The process of claim 1 wherein said sulfating agent is an alkali acetyl sulfate.

6. The process of claim 1 wherein said alkali cellulose ether sulfate has a D.S. of at least 0.21 and said cation concentration is at least 0.057.

7. The process of claim 6 wherein said sulfating agent is sodium acetyl sulfate.

8. The process of claim 6 wherein said sulfating agent is potassium acetyl sulfate.

9. The process of claim 1 wherein said precipitate is purified by washing with water at a temperature of at least 80° C.

10. The process of claim 1 wherein said precipitate is purified by washing with a water solution having a salt concentration of from about 0.9 to about 2.5% by weight.

11. The process of claim 10 wherein said washing is carried out at a temperature of at least 80° C.

12. The process of claim 1 wherein said precipitate is purified by dialysis.

13. A process for manufacturing sodium ethyl cellulose sulfate comprising:
   (a) reacting together ethyl cellulose ether and sodium acetyl sulfate in a mixture comprising the ether, the sodium acetyl sulfate, and a lower fatty acid anhydride to form a reacted mixture comprising sodium ethyl cellulose sulfate;
   (b) forming a mother liquor by combining said reacted mixture with water and precipitating from said mother liquor, sodium ethyl cellulose sulfate and co-precipitated salt impurities by maintaining said mother liquor at a pH of at least about 3.8 and at a cation concentration of at least the value which satisfies the relationship:

$$\text{Log}_{10} \, C^+ = 15.0 \, (D.S.) - 4.4$$

where
   $C^+$ is defined as the cation concentration in the mother liquor in gram equivalent per liter; and
   D.S. is defined as the degree of sulfate substitution in moles of $SO_4^=$ group per anhydrous glucose unit; and
   (c) separating said precipitate from said mother liquor and purifying same to remove co-precipitated salts by washing said precipitate with water at a temperature of at least about 80° C.

References Cited
UNITED STATES PATENTS

| | | | |
|---|---|---|---|
| 3,049,537 | 8/1962 | Klug et al. | 260—232 |
| 3,131,176 | 4/1964 | Klug | 260—231 |
| 3,341,516 | 9/1967 | Savage et al. | 260—232 |
| 3,497,496 | 2/1970 | Crane | 260—232 |
| 3,549,617 | 12/1970 | Whitmeyer | 260—232 |

DONALD E. CZAJA, Primary Examiner

R. W. GRIFFIN, Assistant Examiner